455-613 AU 233 EX EXAMINE 230
FIP8106 OR 3,111,587

(1)

Modulated infrared radiation from a semiconductor

Caldwell

Nov. 19, 1963 Y. A. ROCARD 3,111,587

2 ,/05

N.F.P.

INFRA-RED RADIANT ENERGY DEVICES

Original Filed Sept. 30, 1954 3 Sheets-Sheet 1

Telescope aligning Fig. 22

Corner reflector Fig. 20 18 21 25

INVENTOR
YVES A. ROCARD
BY Strauch, Nolan & Diggins
ATTORNEYS

Uses recombination process

Nov. 19, 1963 Y. A. ROCARD 3,111,587

INFRA-RED RADIANT ENERGY DEVICES

Original Filed Sept. 30, 1954

3 Sheets-Sheet 2

INVENTOR

Yves A. Rocard

BY Strauch, Nolan + Diggins

ATTORNEYS

INFRA-RED RADIANT ENERGY DEVICES

Original Filed Sept. 30, 1954

INVENTOR
Yves A. Rocard

BY Strauch, Nolan & Diggins

ATTORNEYS 3,111,587

INFRA-RED RADIANT ENERGY DEVICES

Yves A. Rocard, Paris, France, assignor to Hupp Corporation, Detroit, Mich., a corporation of Virginia Original application Sept. 30, 1954, Ser. No. 459,307. Divided and this application May 4, 1960, Ser. No. 26,905
8 Claims. (Cl. 250—199)

This invention relates to devices for the generation, modulation, transmission and reception of infra-red energy.

This application is a division of my co-pending application Serial No. 459,307, filed September 30, 1954, now abandoned.

Infra-red radiant energy has long been recognized as having many advantages over radiation in the visible and other regions of the spectrum for use in optical signalling systems and radiation barrier systems for scanning an area to detect the presence of objects therein. Among the advantages of infra-red are the better transparency of the atmosphere to radiation of infra-red wavelengths than to visible radiation, which permits use of infra-red type systems even where fog, clouds or smoke prevent use of visible light systems. Another important advantage is that infra-red is invisible to the naked eye, hence a signal transmitted by infra-red is less easily intercepted by persons other than the intended recipient, and the presence of an infra-red type radiation barrier system less easily detected by intruders.

More extensive use of signalling and radiation barrier systems of this type has failed to materialize primarily because the systems heretofore known have employed infra-red sources having outputs which could not easily be modulated according to the signal to be transmitted or easily collected into narrow beams of predetermined geometric form. Probably the most commonly used of the known infra-red sources is the incandescent filament or glower, which consists of a metallic or other conductor heated to incandescence by passage of an electrical current therethrough. Due to the large heat capacity of such sources their radiation output lags far behind the heater current and therefore cannot be modulated by varying heater current amplitude except at very low frequencies. The glow element must have a relatively large surface area for emission of adequate quantities of infra-red, hence it does not constitute a pin-point or quasi pin-point source and must be provided with a complex optical system if the radiation emitted thereby is to be collected into a narrow beam of parallel rays as required for most signalling and radiation barrier systems. Moreover, such a source emits visible as well as infra-red radiation and for many applications must be provided with a filter for absorbing this visible radiation. Such filter adds to the cost of the system and, by absorbing some infra-red radiation as well as the visible, to its inefficiency.

In accordance with the present invention it is possible to obviate the above described disadvantages of known infra-red signalling and radiation barrier systems and to improve the efficiency and usefulness of such systems, by use of infra-red radiant energy sources wherein a modulated electric current is passed through a point contact to germanium or other semiconductor material to cause emission therein of infra-red radiation modulated correspondingly to the current.

It has been previously reported that if an electric current is brought through an electrode having point contact with a body of semiconductor material such as germanium, the electrons in the material are attracted towards the point, thereby leaving "holes" in the semiconductor material. The recombination of electrons from the negative electrode with these "holes" causes the emission of infra-red radiation at a wave length of about 2 to 3 microns. This phenomenon is evident in most semiconductors under the same conditions; i.e., the injection of positive "holes" in a semiconductor of the N-type or the injection of electrons in a semiconductor of the P-type will cause this effect.

My invention is directed towards devices utilizing this infra-red emission phenomenon for the generation, modulation, transmission and reception of infra-red radiant energy and for the establishment of radiation barriers for scanning an area to sense the presence of objects therein.

It is accordingly a primary object of this invention to provide new and improved infra-red signalling and radiation barrier systems.

It is also a primary object of this invention to provide new and improved semiconductor infra-red sources capable of emitting and modulating infra-red radiant energy without accompanying emission of visible light.

A further major object of this invention is the provision of novel infra-red emitting devices capable of producing infra-red radiation and of directing the radiation produced into radiant energy beams of predetermined geometric form.

Another important object of this invention is to provide novel semiconductor infra-red emitting devices with several emission points on a single piece of semiconductor material, which emission points may be either similarly or differently modulated.

It is also an object of this invention to provide new and improved semiconductor infra-red energy emitting units containing materials, in addition to the semiconductor material, for providing a broader infra-red emission spectrum and optimum operating impedance, and also to provide units that can be easily manufactured.

Another object of this invention is to provide novel semiconductor infra-red emitting devices in which the semiconductor material is geometrically shaped in a manner to provide optimum output of parallel beams without the use of accessory optical equipment.

A further object of this invention is to provide semiconductor infra-red emitting devices in combination with focusing and receiving units to form new and improved signalling and signal alignment systems.

It is another object of this invention to provide new and improved radiation barrier systems utilizing semiconductor infra-red emitting devices.

It is also an object of this invention to provide novel means for pulsing radiation reflected from a photoreflector by means of mechanical shutters.

These and other objects, features and advantages of the present invention will become more fully apparent by reference to the appended claims and the following detailed description when read in conjunction with the accompanying drawings, wherein:

Figure 25:
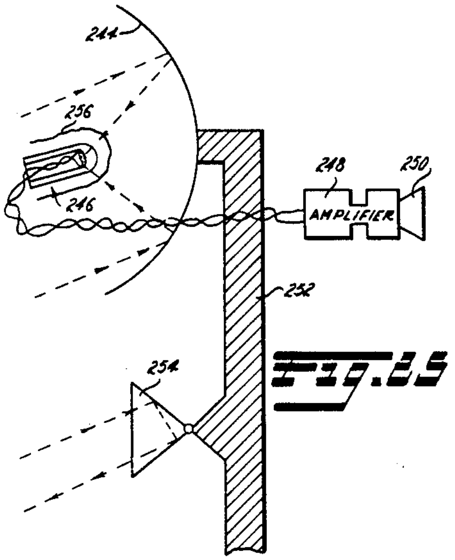
Figure 24:
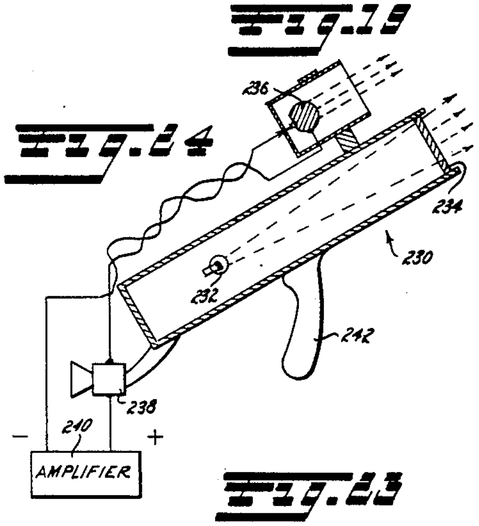

FIGURE 24 is a diagrammatic representation of a device for projecting a fine beam of modulated infra-red radiant energy from a semiconductor source and incorporating a device for aligning said projector by means of an incandescent infra-red source and an infra-red filter; and FIGURE 25 is a diagrammatic representation of a receiving device employing an infra-red sensitive photocell at the focus of a mirror mounted on a support, said support also holding a "photoradiator" for the purpose of reflecting some of the infra-red energy back to the transmitting station for purposes of alignment of the transmitting device with the receiving device.

Figure 1:
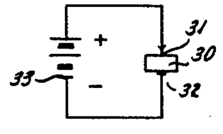
FIGURE 1 is a diagrammatic representation of an arrangement for producing infra-red energy by passing an electrical current through a body of semiconductor material.

With continued reference to the drawings, wherein like reference numerals are used throughout to indicate like parts, FIGURE 1 shows an infra-red emitting device comprising a crystal or pellet 30 of a semiconductor material such as N-type germanium, a positive electrode 31 having point contact with the germanium crystal 30 and a negative or base electrode 32 having large area contact therewith, the positive and negative electrodes being connected with a D.C. current source 33. The positive point contact electrode 31 causes a migration of electrons in the germanium towards the positive electrode with a consequent formation of "holes" in the germanium 30. Electrons from the negative or base electrode 32 then enter the germanium and combine with the "holes." This combination of electrons with the "holes" occurs with an emission of infra-red energy at approximately 1.8 to 3 microns.

Figure 2:
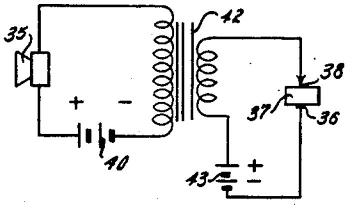
FIGURE 2 is a diagrammatic representation of a device for modulating the infra-red energy emitted from a single point contact to a body of semiconductor material.

FIGURE 2 shows a semiconductor infra-red source the infra-red radiant energy emission of which is modulated in accordance with this invention. Speaking into microphone 35 causes a fluctuation of current from the D. C. source 40 to pass through the primary coil of transformer 42. The secondary coil of the transformer will then modulate the output of D.C. polarizing voltage source 43, and the current flowing from the negative or base electrode 36 into semiconductor crystal 37 will modulate the electron flow to point contact electrode 38, thus causing a correspondingly modulated infra-red emission from the semiconductor crystal. It is important that the polarity of the device remain unchanged so that the direction of electron flow within the semiconductor does not change. Uni-directional flow of current may easily be maintained by making the D.C. polarizing voltage source 43 sufficiently high that it will always be greater than any voltage of opposite sign generated in the transformer 42 or other current modulator in the circuit. The optimum operating current for the semiconductor units is about 500 to 800 milliamperes at 0.5 to 1.0 volt.

As noted above, the infra-red emission phenomenon is a general one evident in most semiconductors under the same conditions. While germanium of either the N- or P-type is the preferred semiconductor material for use in the devices of this invention, other semiconductors such, for example, as silicon carbide (the emission spectrum of which extends into the visible), cadmium sulfide and other binary metal compounds having characteristic infra-red emission may also be used. If the semiconductor to be used is of the N-type the point contact electrode should be connected to the positive side of the D.C. polarizing voltage source and if of the P-type to the negative side thereof.

The infra-red emission of semiconductor units such as shown in FIGURE 2 may be modulated up to very high frequencies (of the order of megacycles per second). The radiation emitted by germanium is only in the infra-red region of the spectrum and includes no radiation of wave lengths within the visible region. This type of infra-red source may therefore be used without the visible light filter necessary to the usual infra-red projection devices. Because the semiconductor material is transparent to the infra-red radiation formed by the combination of electrons and "holes" therein, the radiation can escape from the semiconductor for projection purposes.

For some applications it may be advantageous to shape the semiconductor crystal as shown in FIGURE 2 or to leave it in the shape in which originally found or produced, so that the radiation emitted within the crystal will not be refracted or reflected by its passage through the exit surfaces thereof into a beam of particular geometric pattern. Because substantially all of the infra-red radiation is emitted in the immediate vicinity of the point contact electrode, however, it is readily possible to focus the emitted radiation into a projected beam of any desired geometric form. This may be done by forming the crystal in a manner such that its exit surface has an optimum geometric shape, as detremined by the general principles of optics, for the projection of narrow beams of infra-red radiation.

Figure 9:
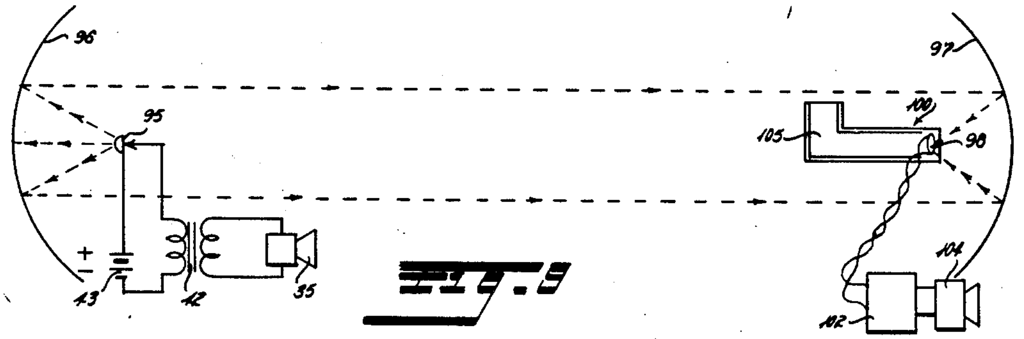
FIGURE 9 is a diagrammatic representation of a semiconductor device for transmitting modulated infra-red radiant energy and a device for receiving said energy by means of a cooled infra-red sensitive photocell.

If the infra-red emitter is to be used in combination with a mirror or lens for focusing the emitted radiation, the exit surface of the semiconductor body through which the radiation escapes is preferably in the form of a segment of a sphere the center of which is at or near the point contact electrode, so that each of the infra-red rays emitted at the point contact will be normal to the exit surface at the point at which it passes through that surface. There will then be no refraction or "bending" of the rays due to the high index of refraction of the semiconductor material, and the emitter will constitute an apparent pin-point source which, when placed at the focal point of a mirror or lens, will provide a very narrow beam of parallel rays without appreciable aperture. An emitter and mirror system of this type is shown in FIGURE 9, for example. While mirrors are used in this illustration, it is not essential that mirrors or lenses be used and if the exit surface of the emitter is shaped in the manner described hereinafter with particular reference to FIGURES 12–14, no mirror or lens is necessary to obtain such a narrow beam.

Figure 3:
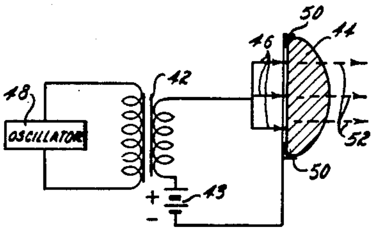
FIGURE 3 is a diagrammatic representation of a device for modulating the energy emitted from more than one point contact on a piece of semiconductor material.

In FIGURE 3 a germanium crystal 44 is employed as an infra-red emitter utilizing several point contacts 46 for the positive electrodes. Several points are used instead of a single point to increase the infra-red radiation output of the germanium crystal. The point contacts are shown widely spaced from each other in FIGURE 3 only for purposes of clarity of illustration; in practice the several points are placed closely together so that the geometric form of the germanium crystal, and its associated optical system if any, can focus the infra-red radiation emitted from all the points. An oscillator 48 emits a signal which passes through transformer 42 and modulates the current input from the D.C. source 43. Electrons within the germanium migrate towards the positive point contact electrodes 46 and new electrons enter the germanium crystal through the negative electrode 50. The combination of the electrons entering the crystal through electrode 50 with the "holes" produced by the migration of electrons already in the crystal toward point contacts 46 produces the infra-red energy which is emitted as shown by dotted lines 52.

Figure 4:
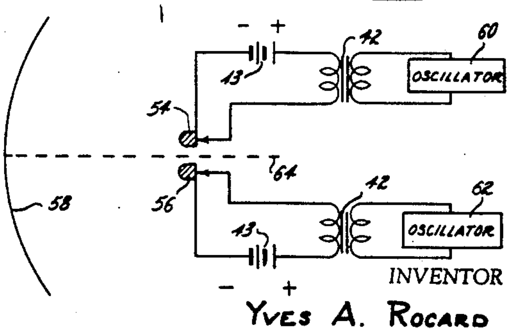
FIGURE 4 is a diagrammatic representation of a device employing two unattached semiconductor units for producing an extremely fine beam of infrared energy which extends between two areas of modulated infra-red energy and which is itself either non-modulated or modulated in a manner different from the energy in said areas.

In FIGURE 4, two germanium crystals 54 and 56 are placed at the focal point of a mirror 58. A signal of 400 cycles per second is emitted by oscillator 60, thus modulating the current entering the germanium crystal 54. Another oscillator 62 modulates the current entering crystal 56. This second oscillator emits a signal of 1,000 cycles per second of the same intensity as the signal emitted by oscillator 60. The modulated infra-red energy output of the crystals 54 and 56 impinges on mirror 58. Two modulated infra-red beams are reflected, one at 400 and the other at 1,000 cycles per second and the intersection of these two beams comprises a narrow beam 64 which is made up of 400 and 1,000 cycle signals of equal intensities.

Figure 5:
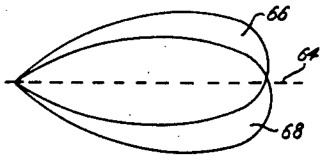
FIGURE 5 is a diagram showing the pattern of radiation emitted by the device represented by FIGURE 4.

FIGURE 5 shows diagrammatically the areas covered by the infra-red energy reflected by mirror 58 in FIGURE 4. Area 66 represents the 400 cycle beam. Area 68 represents the 1,000 cycle beam. The beam in which the 400 and 1,000 cycle signals are of equal intensity is indicated by line 64. Such a beam may be used as an aid to navigation of aircraft or naval vessels, the beam being directed to mark the path along which the plane or ship is to be guided. An infra-red detector carried in the plane or ship will detect 400 and 1,000 signals of equal intensities so long as the vessel remains on course, but either the 400 or the 1,000 cycle signal will predominate over the other should the vessel wander off course. This system is particularly effective where the obstruction to normal vision is due to fog, clouds or the like, since these are relatively transparent to infra-red radiation.

The device of FIGURES 4 and 5 may also be used as an easily aligned transmitter for an infra-red signalling system, such transmitter being adjusted until the receiver at which its beam is directed detects 400 and 1,000 cycle signals of equal intensity. The transmitter and receiver are then properly aligned for best signal transmission and reception.

Figure 6:
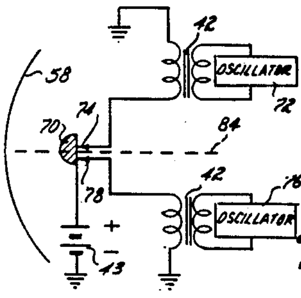
FIGURE 6 is a diagrammatic representation of a device employing a single semiconductor unit having two point contact electrodes for producing an extremely fine beam of infra-red energy which may or may not be modulated and which extends between two areas of modulated infra-red energy.

In FIGURE 6 a single germanium crystal 70 having two point contact electrodes at the focal point of mirror 58 provides substantially the same result as obtained from the two crystals of germanium used in the apparatus represented by FIGURE 4. The oscillator 72 emits a signal of 400 cycles per second through point contact electrode 74 into the germanium crystal 70 while oscillator 76 emits a signal of 1,000 cycles per second through the point 78 into the germanium 70. The modulated infra-red energy emitted at the points 74 and 78 impinges on mirror 58 and is reflected in the pattern shown in FIGURE 7.

The multi-point single crystal system of FIGURE 6 is, in general, interchangeable with the multiple crystal system of FIGURE 4 and can be used in the same manner and for the same purposes as that system. A comparison of the signal patterns shown in FIGURES 5 and 7 shows the different systems to have similar signal outputs.

The device represented by FIGURE 6 can also be operated in another manner. The output of oscillators 72 and 76 may be modulated at the same frequency, for example, 400 cycles per second. The output of oscillator 72, however, may be so modulated that the signal from point 74 is emitted as short pulses, or dots. The output of oscillator 76 may then be modulated in such a manner that the signal from point 78 is emitted as long pulses, or dashes, complementary to the short pulses or dots emitted from the point 74.

Figure 7:
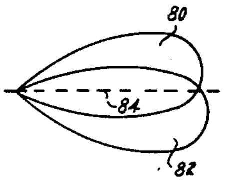
FIGURE 7 is a diagram showing the pattern of radiation emitted by the device represented by FIGURE 6.

In FIGURE 7 area 80 represents the infra-red energy emitted from crystal 70 at point 74 which has been reflected by the mirror 58. Area 82 represents the infra-red energy emitted by crystal 70 at point 74 which has been reflected by the mirror 58. A detector placed in area 80 would receive dots at 400 cycles per second, and one placed in area 82 would receive dashes at 400 cycles per second. A detector placed in the area represented by line 84 would receive a continuous signal made up of the dashes emitted from the point 78 and the complementary dots emitted from point 74.

The device of FIGURE 4 may also be operated in this manner by setting oscillators 60 and 62 (FIGURE 4) at the same frequency with one producing dots and the other producing dashes complementary to the dots.

The systems of FIGURES 4 and 6 when arranged for dot-dash operation may be used in much the same manner as described above with reference to 400 cycle–100 cycle operation, the only difference being that with dot-dash operation a detector kept on the line of intersection of the two radiant energy beams receives a continuous signal of a single frequency, rather than two signals of different frequencies. When the detector is displaced from such line it receives a discontinuous signal made up of either dots or dashes, depending on which side of the line it is displaced to.

Figure 8:
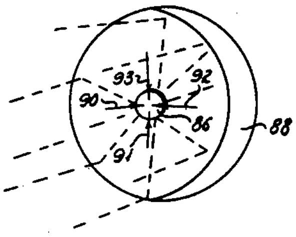
FIGURE 8 is a diagrammatic representation of a semiconductor infra-red emitting device employing four point contacts on the surface of a single crystal of semiconductor material.

In FIGURE 8 a germanium crystal 86 is placed at the focal point of the parabolic mirror 88. The crystal has four infra-red emitter points 90, 91, 92 and 93. By employing the procedures described hereinabove, the output of each point can be modulated at a different frequency or at the same frequency but with different pulse durations. For example, the output of points 90 and 92 could be 400 cycles per second with one point emitting dots and the other dashes complementary to the dots. The output of points 91 and 93 could be modulated at 2,000 cycles per second with one point emitting dots and the other complementary dashes. At the receiving station a high frequency signal (2,000 c.p.s.) and a low frequency signal (400 c.p.s.) would be detected around an axis which is a straight line in space at approximately the axis of the parabolic mirror 88. The signal reflected at the axis of the mirror would be received as a continuous signal by a photosensitive cell. This system gives an indication of alignment in two planes, rather than in a single plane as in the devices of FIGURES 4 and 6. Thus, the beams emitted by points 90 and 92 in FIGURE 8 may be used for horizontal alignment, and those emitted by points 91 and 93 for vertical alignment. Such an arrangement is of particular utility in guiding aircraft as for example in defining the desired glide path for aircraft when landing under poor visibility conditions.

It has been determined that parabolic mirrors are the most efficient in the above discussed devices. Satisfactory materials for construction of these mirrors are copper, zinc, silver or aluminum, all of which are capable of efficiently reflecting infra-red radiation. Glass mirrors with a first surface coating of aluminum or gold are also satisfactory. Any lenses used in the infra-red transmitting or receiving devices described herein should preferably be constructed of materials having maximum transmission properties in the infra-red region, thallium bromide or iodide or mixtures of the two, or silver chloride, being satisfactory.

In FIGURE 9, the infra-red output of germanium source 95 is modulated by microphone 35. The emitted infra-red radiation strikes mirror 96 and is reflected onto mirror 97, by which it is directed to the photoconductive surface 98 of photocell 100. The resistance of the photoconductive surface 98 changes with variations in the impinging infra-red radiation and the modulated output of the cell is amplified by amplifier 102 and delivered to a speaker 104.

The germanium source 95 has an infra-red emission spectrum with a peak at 2.5 microns and emits no visible light. Lead sulfide cells manufactured as described in my United States Letters Patent No. 2,884,345, issued April 28, 1959, are sensitive up to 3.5 microns at room temperature and up to 4 microns at the temperature of liquid air (—180° C.). The lead telluride cells described in United States Letters Patent No. 2,858,398, to Rocard et al., issued October 28, 1958, are sensitive to 6 microns when cooled to the temperature of liquid air (—180° C.). Either cell can be used in the device represented by FIGURE 9 or in any of the devices described herein which employ an infra-red responsive photoconductive cell.

FIGURE 9 shows the photocell as provided with means 105 for cooling it to the temperature of liquid air, the cooling means 105 comprising a hollow-walled flask inserted into one end of the photocell and filled with liquid oxygen or other coolant.

It is important to note that the efficiency of the device represented by FIGURE 9 is high because no infra-red filter or lenses are necessary for the transmission or reception of the infra-red radiation. In devices previously reported, an incandescent infra-red source such as a tungsten filament lamp was employed and this necessitated the use of filters to absorb the visible light. An optically shaped germanium source, on the other hand, will project a beam without the filter or lenses necessary in such other types of infra-red projection apparatus.

It has been previously reported that the deposition of indium in pellet or layer form on an N-type germanium crystal directly under the point electrode contact increases the "hole" density in the area adjoining said contact. I have found that this increase in "hole" density results in a corresponding increase in emission of infra-red radiation in the vicinity of the point contact. Although indium is the preferred metal for use in the devices to be described hereinbelow, other metals can also be employed, such as zinc, cadmium, silver and copper.

Figures 10, 11, 12, 13, 14, 14A, 16, 17:
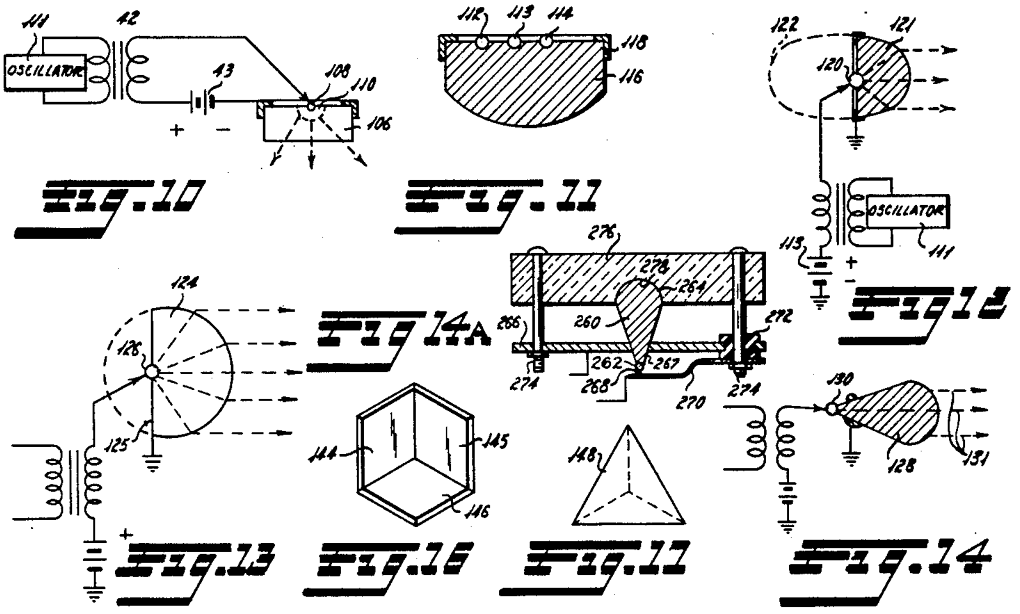
FIGURE 10 is a diagrammatic representation of a semiconductor infra-red emitting device employing a piece of indium placed under the point contact of the semiconductor material.
FIGURE 11 is a diagrammatic representation of a piece of semiconductor material employing three indium pellets embedded in the surface of said material under a like number of point contact electrodes.
FIGURE 12 is a diagrammatic representation of a semiconductor infra-red emitting device shaped in the form of a Cartesian oval section.
FIGURE 13 is a diagrammatic representation of a semiconductor infra-red emitting device shaped in the form of a sphere section.
FIGURE 14 is a diagrammatic representation of a semiconductor infra-red emitting device of conical shape with a radiation exit surface in the form of a sphere section of geometric proportions similar to the Cartesian oval section.
FIGURE 14A is a sectional view of a semiconductor infra-red source having a modified point and base electrode arrangement.
FIGURES 16 and 17 are diagrammatic representations of "photoradiators" suitable for use in the radiation barrier and signal alignment systems of this invention.

In FIGURE 10, an N-type germanium crystal 106 is employed as an infra-red emitter. An indium inclusion 108 is placed in or on the surface of the crystal directly under the point contact electrode by mechanical means or by electrodeposition.

The surface of the crystal may conveniently be prepared and the indium deposited thereon in the manner outlined in the article entitled "Electrochemical Techniques for the Fabrication of Surface-Barrier Transistors" appearing in the December 1953 issue of I.R.E. Proceedings, at pages 1702–1708.

A modulated signal from oscillator 110 causes the included metal at 108 to become more positive, attracting electrons from the germanium. This increases the hole population throughout the germanium, but particularly in area 110. In effect, then, area 110 becomes a P-type germanium section. The inclusion of the pellet or layer of indium or other metal with similar properties under the point contact is advantageous because the infra-red output of the crystal is increased, the units are easier to manufacture, and the resulting impedance values of the device are more satisfactory for instrumentation purposes than those of pure germanium.

It is also possible to produce multiple electrode structures on a single germanium crystal blank as shown in FIGURE 11. Indium underlays 112, 113 and 114 are set into the hemisphere of the N-type germanium crystal 116 directly under the positive point contact electrodes and the negative electrode 118 is positioned on the side of the hemisphere. The indium inclusions should be located sufficiently close to the center of the shaped crystal so that the infra-red radiation is emitted approximately normal to the crystal surface. Infra-red sources of this type including indium or similar metal underlays between the point contacts and the semiconductor material (in this case, germanium) may be employed in the various devices described herein.

We may assume that the emission area in the germanuim source is almost a pin point. With such an assumption we may then determine the best procedure for projection of the infra-red energy in a narrow or broad beam. One method is to use a hemisphere shaped germanium source positioned at the focal point of a mirror which gathers and reflects the infra-red energy within a wide angle. Such a source has been described hereinabove and is illustrated in FIGURE 9. It is also possible to focus the infra-red radiation emitted from the germanium source by proper shaping of the germanium crystal. For example, if emission takes place at 120 in FIGURE 12, the portion of the germanium which allows the exit of a parallel beam from point 120 is a section 121 of the Cartesian oval 122. With the Cartesian oval section it is not necessary to use a mirror or lens to protect a narrow parallel beam of infra-red energy from the crystal.

The index of refraction of germanium in the infra-red region is approximately four and calculations indicate that with such an index of refraction, the Cartesian oval described above is almost a sphere. Thus, a practical solution in the production of the infra-red sources is to use a cross-section 124 (FIGURE 13) of a germanium sphere cut slightly beyond its center at 125. The point electrode is placed at 126. The plane at which the sphere of germanium should be cut to obtain the desired focus of emitted infra-red energy may be determined by infra-red measurements on the emission from the sphere as it is being shaped, and also may be determined mathematically.

The proper cutting plane of a spherical crystal is given by the formula:

$$S=\frac{r}{n-1}$$

where S is the distance between the cutting plane and the meridian plane parallel thereto; $r$ is the raidus of the spherical surface; and $n$ is the index of refraction of the material of which the crystal is made. For the particular semiconductor germanium, the cutting plane is spaced from the parallel meridian plane a distance equal to about one-third the radius of the crystal, since the index of refraction of germanium is in the neighborhood of four for infra-red wave lengths.

It is also possible to form in effect an achromatic doublet at the optically shaped emitting surface of the source unit by capping the surface with a shaped silicon lens, whereby the radiant energy emission from the surface is more finely focused.

FIGURE 14 shows the use of a conical cross-section 128 of either a sphere or a Cartesian oval. The point contact 130 with an indium or similar metal underlay is at the apex of the cone, permitting the emission of parallel beams of infra-red energy as represented by dotted lines 131. This shape allows use of a minimum amount of material and results in the impedance of the unit being higher than in the germanium hemisphere. Such a conical section projects parallel beams of infra-red radiation quite satisfactorily, even though there may be some loss of lateral radiation at the point contact.

The semiconductor infra-red source illustrated in FIGURE 14A is similar in form to that of FIGURE 14, but differs therefrom in its point contact and base electrode arrangement. In FIGURE 14A, the conically shaped germanium crystal 260 as shown has an indium or similar metal inlay 262 at the apical end thereof and a spherical or otherwise optically curved exit surface 264 opposite the inlay 262. The base electrode in this embodiment consists of a metal plate 266 having a central aperture 267 therethrough adapted to fit snugly about the crystal 260, to thus provide good electrical contact between the crystal and plate. The point electrode consists of a pointed member 268 which resiliently presses against indium inlay 262 or directly against crystal 260, and conveniently may be mounted to one end of a leaf spring 270 the other end of which is fastened to but electrically insulated from the base contact plate 266 as by an insulating washer 272 interposed therebetween. The point and base contact assembly 266–272 is removably secured to germanium crystal 260 by bolts 274 passing through an infra-red transparent plate 276 provided with a central recess 278 therein shaped complementarily to the optically curved exit surface 264 of crystal 260. If desired, the infra-red transparent plate 276 may be of silicon and have its center portion shaped to provide an achromatic doublet as described above.

The electrode arrangement of FIGURE 14A is of particular advantage in that it permits limited adjustment of the base and point contact electrodes, as by slightly varying the diameter of the central aperture 267 in base electrode plate 266 and/or shifting point contact spring 270 with respect to the base electrode plate, and thus enables positioning the electrodes to obtain maximum radiant energy emission. A further and equally important advantage in the device of FIGURE 14 resides in its freedom from soldered electrodes; soldering operations frequently cause undesirable change in characteristics of the germanium or other crystal and for this reason are to be avoided.

The ease of modulation of the germanium source coupled with its large infra-red radiation output permits the use of such sources in devices for transmitting and receiving infra-red radiation over long distances. Because of the very low time constants of the sources and receiving cells, the devices perform even more satisfactorily than normal telephonic communication equipment. The narrowness of the infra-red energy beam emitted from the source makes it preferable to transmit the signals between two fixed points or to utilize special supplementary equipment for aiming the transmitter at the receiver, or vice versa.

In addition to providing a highly satisfactory communication system, the device represented by FIGURE 9 may also be employed as a radiation barrier by utilizing a fixed frequency signal at the source 30 instead of the signal modulated by microphone 38.

Figure 15:
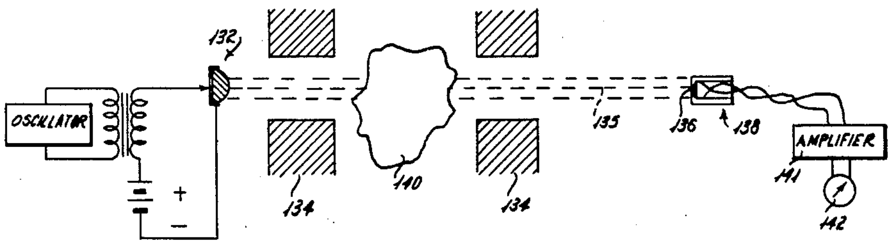
FIGURE 15 is a diagrammatic representation of an infra-red barrier device without optical components for the scanning of an object or area within a short distance.

FIGURE 15 illustrates a radiation barrier designed for short distances (about three meters) employed as a protective device without the need for optical accessories. A source 132 behind one of the walls 134 projects a parallel beam of infra-red radiation represented by lines 135 onto a photoconductive layer 136 of cell 138. An object 140 passing in the area between walls 134 will cause a change in conductivity of cell layer 136 and the signal thus produced is amplified by amplifier 141 to actuate a meter or alarm mechanism 142. This unit may thus be used to protect a corridor, door, safe, etc., in a relatively simple and undetectable manner.

The term "photoradiator" as used herein refers to a device which reflects a projected beam of radiation directly back to its source with a minimum loss of energy. FIGURE 16 shows a reflecting device of this type, made up of three plane mirrors 144–146 which are preferably, but not necessarily, first surface mirrors. The three mirrors are disposed perpendicularly to each other and are interconnected into a unitary assembly as shown. FIGURE 17 shows a "photoradiator" similar in function to that of FIGURE 16 but employing a prism 148 rather than mirrors, the prism being a reflecting prism of tetrahedonal form and having a front face in the form of an equilateral triangle arranged normal to the radiation which the prism is to reflect. The prism should be fabricated of a material which is transparent to infra-red and which has an index of refraction such that the desired specular reflection occurs at the reflecting faces of the prism. These reflecting faces, namely, the three faces of the prism which extend rearwardly of the face arranged normal to the impinging radiation, are congruent isosceles triangles the base dimension of which is selected to provide a prism of desired frontal area and the altitude of which is such that each reflecting face lies in a plane disposed at an angle of 45° to the plane of the front face of the prism. It can easily be shown that to meet this requirement it is necessary that the altitude of each triangular reflecting face be approximately 0.408 times the base dimension thereof and that the base angles be approximately 39° 13′. Specular reflection will then occur at the reflecting face first impinged upon by any one ray, to turn that ray through an angle of 90° and onto a second reflecting surface where it is again turned through 90° and thus aimed directly back at its point of origin. "Photoradiators" of this type are described and claimed in my application Serial No. 399,674, filed December 22, 1953, now abandoned.

Figure 18:
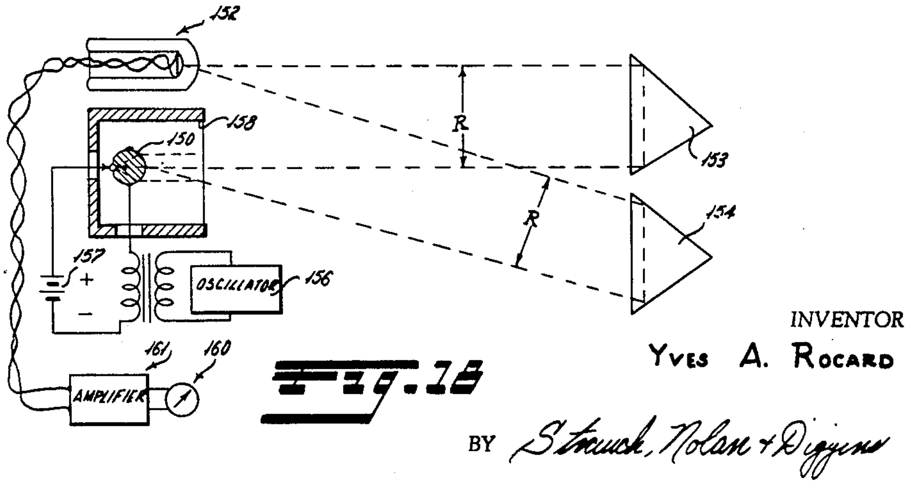
FIGURE 18 is a diagrammatic representation of a radiation barrier device employing a semiconductor infra-red source along with "photoradiators" and an infra-red sensitive photocell.

A radiation barrier employing one of these "photoradiators" is shown in FIGURE 18 and includes in the active station the transmitter 150 and receiver 152. The passive station consists of the "photoradiators" 153 and 154 which may be of either the mirror type shown in FIGURE 16 or the prism type shown in FIGURE 17. Only the active station is initially adjusted and no further maintenance is necessary. The projected and reflected beams of infra-red energy constitute the radiation barrier. Because of the dimensions and characteristics peculiar to the germanium infra-red source, the "barrier" area is different from that reported in my above mentioned application Serial No. 399,674.

The signal emitted from oscillator 156 causes a modulated current from battery 157 to pass through germanium source 150 located in shield 158. The modulated infra-red beam thus produced is projected on to "photoradiators" 153 and 154 which reflect the energy back to photoconductive infra-red sensitive cell 152. So long as the signal impinging on cell 152 is constant, the circuit of the alarm device 160 remains open. If the radiation between the active and passive stations is interrupted, the change in signal received by cell 152 is amplified by amplifier 161 and actuates the meter or alarm mechanism 160.

Because the source 150 is very small, the "photoradiators" 153 and 154 will reflect beams equal to a circle of radius R where R is equal to the largest useful dimension of the "photoradiator." Cost considerations make it usually impractical to construct very large "photoradiators," especially for infra-red radiation and an R of 3 cm. has been found quite satisfactory for most purposes.

Figures 19, 20:
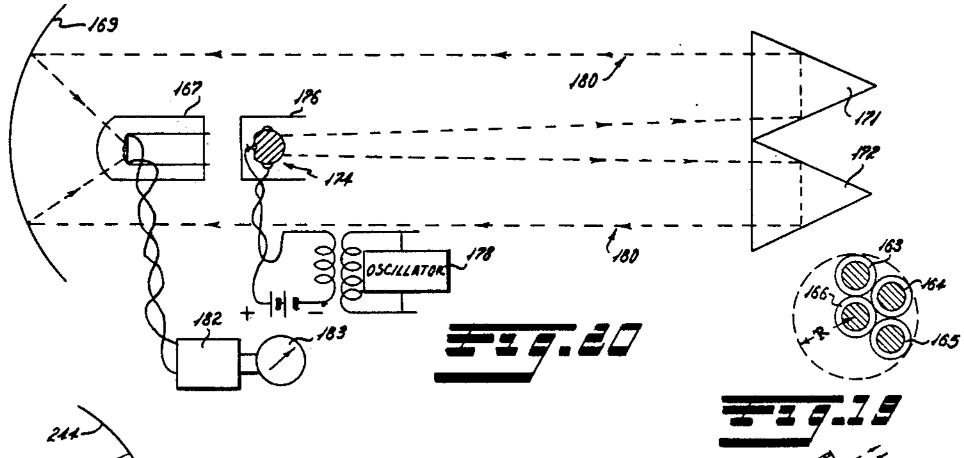
FIGURE 19 is a diagrammatic representation of a barrier device employing a series of infra-red sensitive photocells concentrically placed around a semiconductor infra-red source.
FIGURE 20 is a diagrammatic representation of a barrier device employing a modulated semiconductor infra-red source, two "photoradiators" and an infra-red sensitive photocell placed at the focal point of a mirror.

For maximum utilization of the energy reflected from the "photoradiators," an arrangement such as shown in FIGURE 19 may be employed. Photoconductive infra-red sensitive cells 163, 164, 165, etc., may be placed concentric to infra-red source 166, within radius R to utilize the area $\pi R^2$ with maximum efficiency. Another satisfactory procedure for utilizing all the energy in this area $\pi R^2$ is illustrated by FIGURE 20.

In FIGURE 20 the photoconductive infra-red sensitive cell 167 is placed at the focal point of mirror 169, whose optimum diameter is 2R where R is the maximum useful dimension of the "photoradiators" 171 and 172. The infra-red energy from the germanium source 174 in shield 176 placed directly behind the photocell is modulated by oscillator 178 and is projected on to "photoradiators" 171 and 172. The infra-red energy represented by lines 180 is then reflected from the "photoradiators" back to mirror 169 and onto the photoconductive surface of cell 167 located at the focal point of mirror 169. If an object interrupts the "barrier" thus formed by the projected and reflected infra-red radiation, a change in photoconductivity results in cell 167 and the signal thus produced is amplified by amplifier 182 to actuate meter or mechanism 183.

Figures 21, 22:
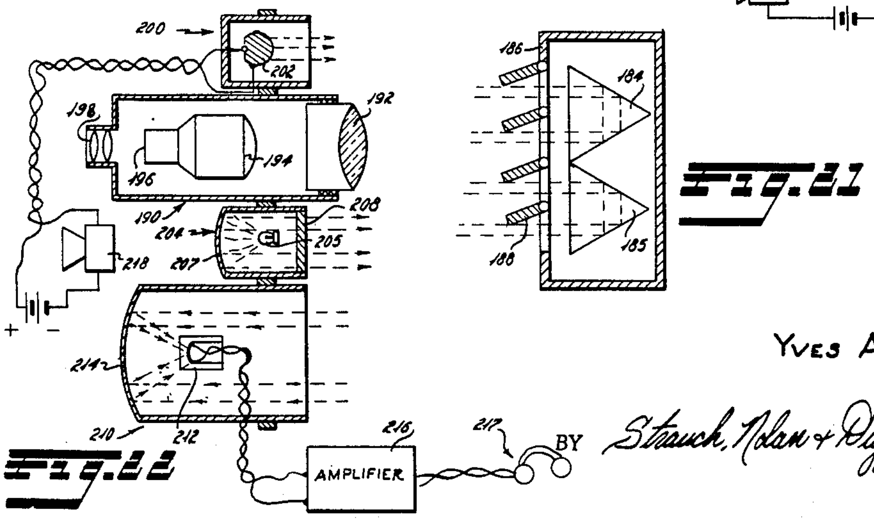
FIGURE 21 is a diagrammatic representation of a device for pulsing the radiation reflected from the "photoradiator" by means of mechanical shutters.
FIGURE 22 is a diagrammatic representation of a device for transmitting infra-red energy emitted from a semiconductor source, a means for accurately aiming this device by use of an incandescent infra-red source and an "electronic telescope," and means for receiving the modulated signal from the semiconductor source by use of an infra-red sensitive photocell placed at the focal point of a mirror.

FIGURE 21 shows a system for pulsing the radiation reflected from the "photoradiators." Radiation projected by a source such as an incandescent lamp, filtered or unfiltered, or a germanium crystal, impinges on "photoradiators" 184 and 185 located in housing 186 and is reflected back to an area determined by the positioning of the "photoradiators." The projected and reflected radiation can then be pulsed with mechanical shutters 188 to produce a signal or "scott noise" for reception by a receiving station located either at the source of the radiation or elsewhere. This arrangement permits two-way communication between stations only one of which is provided with a radiant energy projector.

While there are many advantages to the narrow, pin point beams of radiation provided by the germanium infra-red emitters described hereinabove, the very narrowness of the beams renders it more difficult to properly align them with the receiving stations to which their signals are directed. FIGURE 22 shows a device that will greatly facilitate accurate aiming of the infra-red beam emitted from a germanium infra-red source. There are essentially four units in this device. The first is an "electronic telescope" 190 of conventional type, composed of objective lens 192, image converter 194, fluorescent screen 196 and ocular 198. The second unit is a germanium infra-red source 200 containing the germanium crystal 202 properly housed as disclosed for example in FIGURE 18 and firmly mounted on telescope 190. The third unit is a high power incandescent infra-red beacon 204 composed of an incandescent lamp 205, mounted at the focal point of concave mirror 207, and an infra-red filter 208. The fourth unit is an infra-red receiver 210 composed of an infra-red sensitive photoconductive cell 212, which may be of the lead sulfide type, mounted at the focal point of mirror 214. The signal received by this unit is fed into an amplifier 216 and then to speaker or headphones 217.

A device such as that represented by FIGURE 22 is placed at both the receiving and transmitting stations located at widely separated points and the following procedure used to align the devices for message transmission by modulated infra-red radiation. Each station lights its infra-red beacon 204 and the "electronic telescope" 190 is used to detect the beacon from the opposite station. Cross hairs located at the ocular of the "electronic telescope" allow proper positioning of the instrument in the center of the field of radiation projected by the beacon 204 from the opposite station. When the beacon of one station is properly centered in the cross hairs of the "electronic telescope" of the other station, the germanium source 200 of the transmitting station is in line with the receiving unit of the receiving station. Speaking into the microphone 218 of the transmitting station causes a modulation of the infra-red energy output of the germanium source 200 and this modulated infra-red signal is received by the receiver 210 of the opposite station. The photoconductivity of cell 212 changes with the variations caused by impinging infra-red radiation and the resulting signal is amplified by amplifier 216 and is then passed into speaker or earphones 217. Optical devices such as additional mirrors or lenses may be added to the germanium source 200 or to the receiver 210 if desired.

The device represented by FIGURE 22 may also be used to set up a radiation barrier between itself and "photoradiators" placed at a distant location. The technique described above may then be used to align the devices so that the radiation emitted by the germanium source 200 impinges on the "photoradiators" and is reflected back to the receiver unit 210.

Figure 23:
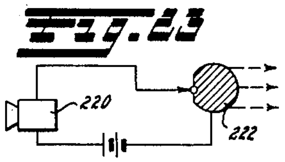
FIGURE 23 is a diagrammatic representation of a device for modulating the infra-red energy emitted from a semiconductor source by the use of a carbon microphone placed in series with a battery and the point contact of the germanium crystal.

As noted above, the germanium infra-red source requires a current of about 500 to 800 milliamperes per point for satisfactory operation. When an indium layer or insert is placed between the point and the germanium, the current requirements are substantially higher and the germanium source thus requires a D.C. power supply of the same order of magnitude as that required for the operation of a standard carbon microphone. FIGURE 23 shows an arrangement whereby the modulation of current from the direct current source by the carbon microphone 220 produces a modulated infra-red signal from the germanium source 222. It is thus possible to construct very simple germanium infra-red sources for wireless communication at short distances.

FIGURE 24 shows a hand-held device for projecting and aiming a fine beam of infra-red radiation over short distances (5 meters to 200 meters) for purposes of message transmission. An infra-red beacon 230 is composed of an incandescent lamp 232 mounted in a housing behind infra-red filter 234. Mounted on the top of this beacon is a germanium infra-red source 236 connected to microphone 238 and amplifier 240. The entire assembly is manipulated by handle 242 until the infra-red radiation projected by the beacon 230 impinges on the distant receiving station. The beacon is then extinguished and the infra-red output of the germanium source 236 is modulated by speaking into the microphone 238. The modulated infra-red signal is then received by a unit similar to that shown in FIGURE 25.

In the device represented by FIGURE 25 the mirror 244 receives the infra-red radiation projected by the germanium source in the device represented by FIGURE 24 and reflects it on to an infra-red sensitive photoconductive cell 246 placed at the focal point of the mirror. The signal caused by the change in photoconductivity due to the impinging modulated infra-red radiation is amplified by amplifier 248 and is fed into speaker 250. The receiving device is mounted on a support 252. A "photoradiator" 254 is also mounted on the support to assist the projecting station in properly aiming the message transmitting device. It also may be advantageous to surround the receiving cell 246 with black cellophane 256. This prevents visible light from impinging on the cell but allows infra-red radiation to pass. The apparatus represented by FIGURES 24 and 25 has many uses where a small device is required for transmitting a signal from a station in motion, such as a truck, boat, locomotive, etc., to a receiving station.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A semiconductor infra-red source for producing a modulated beam of infra-red radiation comprising a body of semiconductor material having only one type of impurity atoms, a plurality of electrodes electrically connected to said body with a first group of said electrodes having point contact with only one surface on said body in a small area thereof for increasing the concentration of carries therein and at least one electrode having large area contact with said body, and means connected to said electrodes for passing a modulated current through the electrodes and said semiconductor body to cause increased emission of infra-red radiation from the region of said small area modulated correspondingly to said current.

2. A semiconductor infra-red source for producing a modulated beam of infra-red radiation comprising a body of semiconductor material having only one type of impurity atoms, a plurality of electrodes electrically connected to said body with a group of said electrodes having only point contact within a very small area of said body and spaced closely together to concentrate carrier injection therein, and at least one electrode having large area contact with said body at a point spaced from said small area, and means connecting said electrodes to a common source of modulated current whereby the infra-red emission at all of said point contact electrodes in said very small area is additive.

3. An infra-red source for producing a modulated beam of infra-red radiation comprising a body of semiconductor material having only one type of impurity atoms, a plurality of point contact electrodes grouped closely together to make contact with said body in a very small area thereof for concentrating the carrier injection in said small area and at least one electrode having a large area contact with said body at a point spaced from said small area, means connecting a separate and different source of modulated electric current to different ones of said point contact electrodes so that the infra-red emission in the small area is modulated correspondingly to the respective current source.

4. A semiconductor infra-red source capable of producing an undulated beam of infra-red radiant energy, said source comprising a body of semiconductor material transparent to infra-red radiation, a plurality of electrodes electrically connected to said body with a group of said electrodes having point contact within a small area on said body and being spaced closely together and at least one of the other of said electrodes being a base electrode having large area contact with said body, said large area contact being spaced from and encircling said small area, and means for passing an undulated electric current through the electrodes and said body to cause emission of infra-red radiation in the region of said small area undulated correspondingly to said current, said body having a radiation exit surface formed on the side thereof opposite the surface containing said small area for directing the emitted radiation into a beam of predetermined geometric form.

5. A semiconductor infra-red source for producing and modulating an infra-red radiant energy beam comprising a conically shaped semiconductor crystal having formed on the end thereof opposite the apical end an optically curved radiation exit surface, a base electrode plate having an aperture therein fitted to said crystal with the aperture walls in contact with the conical crystal intermediate the apical and opposite ends thereof, and a point contact electrically contacting the apical end of said conical crystal and mounted to said base electrode plate and electrically insulated therefrom.

6. The infra-red source defined in claim 5 wherein said point contact electrode is resiliently mounted to said base electrode plate.

7. The infra-red source defined in claim 5 wherein said base electrode plate and point contact are mounted to said crystal by an infra-red transparent member having a recess therein receiving at least a portion of said crystal optically curved surface and including means mechanically connected to said base electrode plate to maintain the same in place on the crystal.

8. The infra-red source defined in claim 7 wherein said infra-red transparent member is so shaped and has an index of refraction such that said crystal and member together constitute a substantially achromatic doublet.

References Cited in the file of this patent

UNITED STATES PATENTS

| | | |
|---|---|---|
| 2,692,952 | Briggs | Oct. 26, 1954 |
| 2,861,165 | Aigrain | Nov. 18, 1958 |